United States Patent
Toyohara

[19]

[11] Patent Number: 6,072,601
[45] Date of Patent: *Jun. 6, 2000

[54] OPTICAL FIBER AMPLIFIER AND AN OPTICAL COMMUNICATION SYSTEM USING SAME

[75] Inventor: Atsushi Toyohara, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/022,417

[22] Filed: Feb. 12, 1998

[30] Foreign Application Priority Data

Feb. 17, 1997 [JP] Japan .................................. 9-031955

[51] Int. Cl.[7] .................................................. H04N 1/04
[52] U.S. Cl. .................... 358/484; 359/239; 359/333; 359/341
[58] Field of Search ............................ 356/901; 359/239, 359/244, 333, 341, 342, 343, 127; 358/446, 474, 475, 479, 480, 484, 485

[56] References Cited

U.S. PATENT DOCUMENTS

| | | | |
|---|---|---|---|
| 3,738,756 | 6/1973 | Chaney .................................... | 356/117 |
| 4,884,867 | 12/1989 | Brandstetter et al. ............. | 350/162.12 |
| 5,225,922 | 7/1993 | Chraplyvy ............................... | 359/124 |
| 5,228,103 | 7/1993 | Chen et al. ............................. | 385/14 |
| 5,576,872 | 11/1996 | Kitajima .................................. | 359/117 |
| 5,828,486 | 10/1998 | Yoshida ................................... | 359/341 |
| 5,894,362 | 4/1999 | Onaka ...................................... | 359/124 |
| 5,903,385 | 5/1999 | Sugaya .................................... | 359/341 |
| 5,933,262 | 8/1999 | Sasagawa ................................ | 359/127 |
| 5,943,150 | 8/1999 | Deri ........................................ | 359/133 |

FOREIGN PATENT DOCUMENTS

62-12222 1/1987 Japan .
8-32554 2/1996 Japan .

*Primary Examiner*—Jerome Grant, II
*Attorney, Agent, or Firm*—Whitham, Curtis & Whitham

[57] ABSTRACT

The object of the present invention is realizing an optical fiber amplifier wherein the number of channels actually inputted to the optical fiber amplifier is read by the optical fiber amplifier itself, thereby both allowing, through self-control, optimum operating conditions in accordance with the number of transmission channels and the maintenance of transmission performance. An optical fiber amplifier of this invention that is provided with an optical signal amplifier that amplifies optical signals transmitted on an optical fiber, which is the optical signal transmission line, and a control circuit section that controls the amplifying operation of said optical signal amplifier, comprising a branch circuit that is arranged within the optical signal transmission route and that branches off and extracts a portion of the transmitted optical signal power; and a channel counter that inputs a portion of the branched optical signal power from said branch circuit and that counts the number of channels of the transmitted optical signals; wherein said control circuit section controls the amplification factor of said optical signal amplifier in accordance with the number of channels counted at said channel counter.

17 Claims, 8 Drawing Sheets

OPTICAL FIBER AMPLIFIER AND AN OPTICAL COMMUNICATION SYSTEM USING SAME

BACKGROUND OF THE INVENTION

1. Field of the Invention

The present invention relates to an optical circuit for use in wavelength-division multiplexed optical communication in which a plurality of signal beams having a plurality of wavelengths are propagated on a single transmission line, and particularly to an optical fiber amplifier for batch amplification of multiple wavelengths.

2. Description of the Related Art

In recent years, WDM (Wavelength Division Multiplexer) transmission technology has been receiving attention as a method for high-speed, large-capacity communication in which signals of a plurality of wavelengths are transmitted in a batch.

WDM transmission enables the transmission of a large volume of data at a low transmission speed by transmitting on a plurality of wavelengths. For example, a system in which four wavelengths are sent as a batch at a transmission speed of 2.4 Gbps achieves substantially the same transmission volume as a system in which one wavelength is sent at a transmission speed of 10 Gbps. At the current level of the art, multiplexing wavelengths is technologically more amenable to commercialization than improving transmission speed, and as a result, WDM transmission technology is undergoing considerable development as a means of increasing transmission capacity.

In WDM transmission, the signal level on each channel must be made uniform in order to maintain equal transmission performance on each channel. Signal level is determined by such factors as the wavelength dependency of the transmission line insertion loss or the wavelength dependency of the gain of a optical fiber amplifier, and differences between gain on each wavelength (hereinbelow referred to as "gain flatness") must therefore be reduced to a low level. The gain flatness of an optical fiber amplifier is influenced by fluctuation in gain. Normally, the output level of an optical fiber amplifier is held uniform by ALC (Automatic Level Control). Since output level is fixed despite fluctuation in input level, gain undergoes change, and gain flatness is affected. Experimentation shows that gain flatness deteriorates approximately 0.3 dB in a case in which gain varies 1 dB in a wavelength band of about 1545–1560 nm.

Assuming that the output level for each channel in an optical transmitter is fixed, causes of fluctuation in the input level to an optical fiber amplifier can be broadly divided between fluctuation in propagation loss on a transmission line and change in the number of transmission channels.

Fluctuation in output level resulting from changes in the number of transmission channels has a particularly large effect on gain flatness. The output of an optical fiber amplifier is commonly controlled as the total optical output power, and when the input signal power changes in a case of fixed output control, the gain of the optical fiber amplifier changes. For example, in the case of 16-channel WDM transmission in which the transmission power of each channel is equal, a change in the number of waves of the transmission channel from 16 channels to one channel causes the input level to drop 12 dB (1/16). Because the output power is fixed, the gain of the optical fiber rises 12 dB, and as a result, gain flatness deteriorates by approximately 3.6 dB.

When considering a multiple-stage relay, the minimum possible gain flatness (1 dB or less) is preferable for maintaining transmission performance, and the technique for controlling gain with respect to changes in the number of channels is therefore crucial. In the prior art, output level was determined by inputting channel number information to a control circuit of the optical fiber amplifier by electrical signals.

For example, if the total input power is −8 dBm and the total output power is +20 dBm (gain 28 dB) for 16 channels, control must be effected such that total input power is −11 dBm and total output power is +17 dBm (gain 28 dB) during transmission of 8 channels.

FIG. 1 and FIG. 2 are block diagrams showing the constructions of optical fiber amplifiers of the prior art.

In the prior-art example shown in FIG. 1, channel number information signal S201 is inputted to control circuit 204 by a system distinct from the optical fiber transmission line, and control circuit 204, in accordance with the number of channels indicated by channel number information signal S201, determines the amplitude of optical signal amplifier 201 that amplifies optical signals transmitted on the optical fiber transmission line.

The prior-art example shown in FIG. 2 raises the amplification capacity by using two optical signal amplifiers 211 and 212. In this case, channel number information signal S201 is inputted to control circuit 204 from a system distinct from optical fiber transmission line, and control circuit 204, in accordance with the number of channels indicated by channel number information signal S201, determines the amplitudes of optical signal amplifiers 211 and 212 that amplify optical signals transmitted on the optical fiber transmission line.

Constructions for inputting channel number information signal S201 to control circuit 204 from a system distinct from the optical fiber transmission line include a system by which the signal is inputted to control circuit 204 as an electrical signal from a line distinct from the optical fiber transmission line, and a system by which the signal is inputted on the optical fiber transmission line using a wavelength distinct from the signal wavelength (for example, with the signal in the 1.55-μm band and the channel information in the 1.31-μm band), OE-converted, and then inputted to control circuit 204.

Recent years have seen great activity in the development of circuits (hereinbelow referred to as an "ADD/DROP circuits") that are provided with an optical branching/coupling capability whereby optical signals are branched off midway on the transmission line and outputted to a separate branch line (DROP) or optical signals are added (ADD) to the transmission line from a separate branch line. In a case in which an ADD/DROP circuit is incorporated into the optical fiber amplifier, one possible construction for suppressing deterioration in NF (Noise Figure) due to the insertion loss of the ADD/DROP circuit involves dividing the optical fiber amplifier between a preceding stage and a succeeding stage and inserting the ADD/DROP circuit between them Because the number of channels changes between the preceding stage and succeeding stage in such a construction, information on channel number for each must be conferred to the circuits that control the preceding stage and succeeding stage.

FIG. 3 and FIG. 4 are block diagrams showing the construction of examples of prior-art optical fiber amplifiers that use the above-described ADD/DROP circuit. In these two cases, ADD/DROP circuit 209 is inserted between two optical signal amplifiers 211 and 212.

In the example of the prior art shown in FIG. 3, control circuit 241 causes optical signal amplification to be carried out at optical signal amplifier 211 in accordance with the channel number indicated by channel number information signal S201, and further, transfers the channel number indicated by channel number information signal S201. In addition to carrying out optical amplification, optical signal amplifier 211 employs optical signals of a wavelength distinct from the signal wavelength to output the channel number indicated by channel number information signal S201 to ADD/DROP circuit 209 by way of the optical transmission line. ADD/DROP circuit 209 transmits to optical signal amplifier 212 by way of the optical transmission line by carrying out optical branching/coupling and in addition outputs the channel number indicated by channel number information signal S201 to control circuit 242 as channel number information signal S202. Control circuit 242 directs optical signal amplification at optical signal amplifier 212 in accordance with the channel number indicated by channel number information signal S202.

The operation in the prior-art example shown in FIG. 4 is for the most part equivalent to that of the prior-art example shown in FIG. 3, but this example adopts a construction by which channel number information signal S201 is directly inputted to both control circuit 241 and to control circuit 242, the thus achieved optical amplification control being performed at optical signal amplifiers 211 and 212.

PROBLEMS THE PRESENT INVENTION SEEKS TO SOLVE

In an optical fiber amplifier according to the above-described prior art, channel number information for regulating gain flatness is conferred to the control circuit of an optical signal amplifier in the form of electrical signals, and in a case in which, for whatever reason, the actual channel number inputted to the optical fiber amplifier fails to match the information of the electrical signal, optimum operation of the optical fiber amplifier becomes impossible and deterioration of gain flatness tends to occur.

For example, in a case in which particular wavelengths are not combined in a device (MUX: multiplexer) that combines at a wave coupler the waves of a signal light source having a plurality of wavelengths and outputs to a single optical fiber, channel number information for n channels (n being a natural number) is inputted to the control circuit, but only n-m channels (where m is the number of wavelengths not combined, and $n \geq m \geq 0$) are transmitted.

As a result, control of optical fiber amplifiers corresponding to n channels is carried out while only n-m channels are inputted, and gain flatness is therefore degraded.

Gain flatness is one of the most important factors for maintaining transmission performance, and examples of the prior art therefore suffer from the problem that the maintenance of transmission performance cannot be guaranteed.

SUMMARY OF THE INVENTION

The present invention was developed in view of the above-described problems of the prior art and has the object of realizing an optical fiber amplifier wherein the number of channels actually inputted to the optical fiber amplifier is read by the optical fiber amplifier itself, thereby both allowing, through self-control, optimum operating conditions in accordance with the number of transmission channels and the maintenance of transmission performance.

The optical fiber amplifier of this invention is provided with an optical signal amplifier that amplifies optical signals transmitted on an optical fiber, which is the optical signal transmission line, and a control circuit section that controls the amplifying operation of the optical signal amplifier, and includes:

a branch circuit arranged within the optical signal transmission route that branches off and extracts a portion of the transmitted optical signal power; and a channel counter that inputs a portion of the branched optical signal power from the branch circuit and counts the number of channels of the transmitted optical signals;

wherein the control circuit section controls the amplification factor of the optical signal amplifier in accordance with the number of channels counted at the channel counter.

An optical fiber amplifier according to a modification of the present invention is provided with optical signal amplifiers that amplify optical signals transmitted on an optical fiber, which is the optical signal transmission line, and control circuit sections that control the amplification operation of the optical signal amplifiers; and includes:

a plurality of optical amplification devices, each comprising: a branch circuit that is arranged within the optical signal transmission route that branches off and extracts a portion of the transmitted optical signal power; and a channel counter that inputs a portion of the branched optical signal power from the branch circuit and counts the number of channels of the transmitted optical signals;

wherein the control circuit sections control the amplification factors of the optical signal amplifiers in accordance with the number of channels counted at the channel counters; and wherein optical circuits having a drop/add capability are provided between each of the plurality of optical amplification devices.

In either of the above-described modifications, branch circuits may be arranged at the input section of the optical signal amplifiers, or may be arranged at the output section of the optical signal amplifiers.

In addition, the optical fiber may be composed of fiber having a rare-earth additive.

An optical communication system according to the present invention has at least one optical fiber amplifier constructed as described hereinabove that is inserted within the optical transmission line.

The optical fiber amplifier of the present invention incorporates a channel counter and effects amplification control by counting the number of channels actually transmitted and feeding this information back to the control circuit, thereby enabling both optimum operation in accordance with the number of actually transmitted channels as well as stabilized gain flatness.

The above and other objects, features, and advantages of the present invention will become apparent from the following description with references to the accompanying drawings which illustrate an examples of the present invention.

DETAILED DESCRIPTION OF THE PREFERRED EMBODIMENTS

Embodiments of the present invention are next described with reference to the accompanying drawings.

Figure 1:
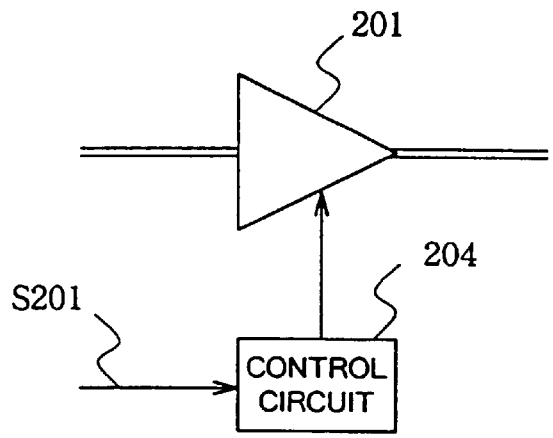
FIG. 1 is a block diagram showing the construction of an example of the prior art.
Figure 2:
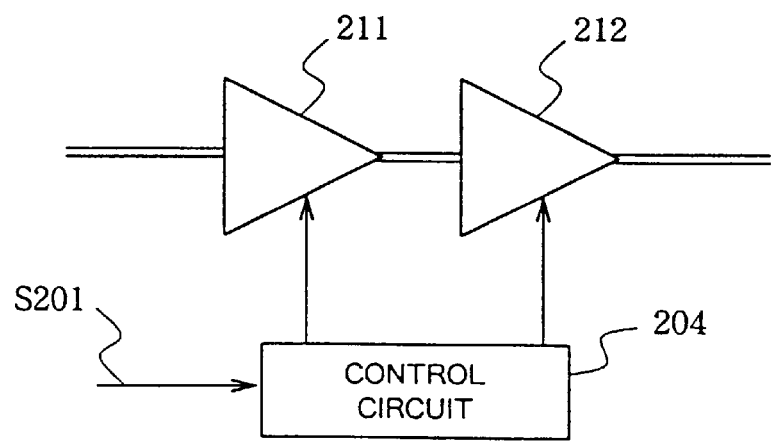
FIG. 2 is a block diagram showing the construction of an example of the prior art.
Figure 3:
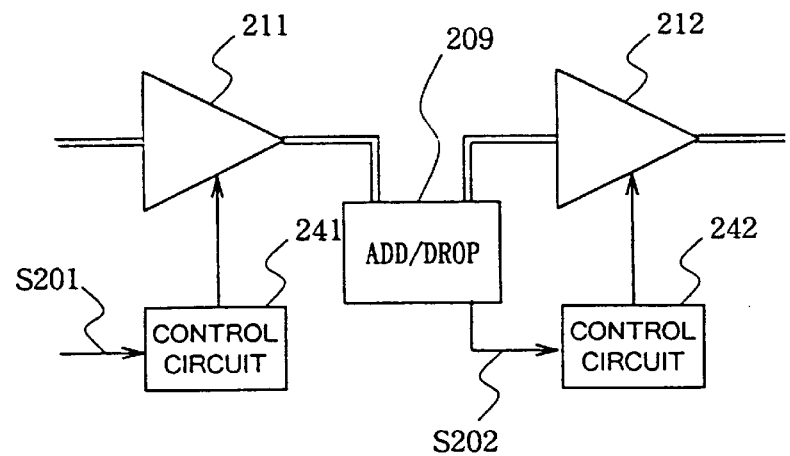
FIG. 3 is a block diagram showing the construction of an example of the prior art.
Figure 4:
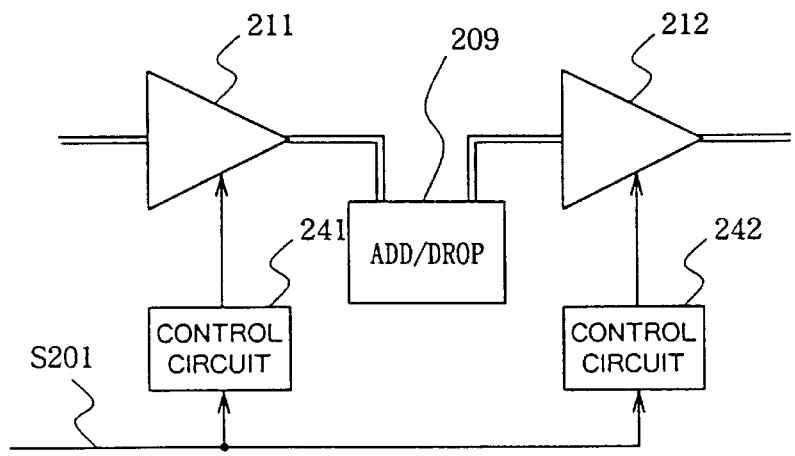
FIG. 4 is a block diagram showing the construction of an example of the prior art.
Figure 5:
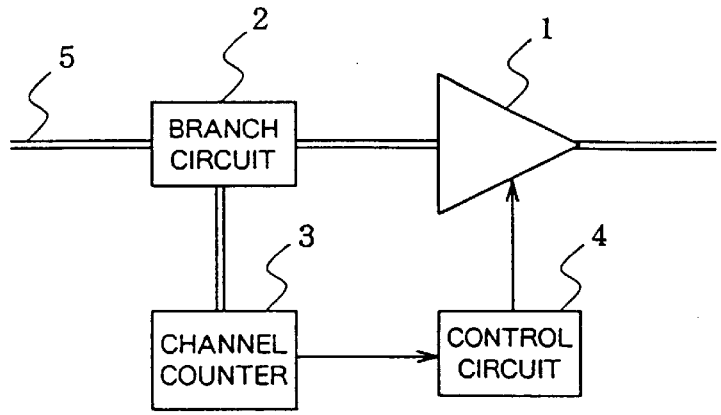
FIG. 5 is a block diagram showing the construction of one embodiment of the present invention.

FIG. 5 is a block diagram showing the construction of one embodiment of the optical fiber amplifier according to the present invention.

In this embodiment, a portion of the signal power of a multiple-wavelength optical signal transmitted on optical fiber 5, which employs a rare-earth additive to obtain a reduction in transmission signal loss, is inputted to channel counter 3 by means of branch circuit 2. The number of waves of the transmitted optical signal are counted at channel counter 3, and this count value is outputted to control circuit 4 as channel number information. At control circuit 4, the output level of the optical signal amplifier [1] is controlled in accordance with the inputted channel number information. This output level control is referred to as AGC (Automatic Gain Control) and is carried out so as to keep the gain at a fixed level.

By means of the construction of this embodiment, the operation of optical signal amplifier 1 is always controlled based on information derived from the actual number of channels, thereby achieving stable gain flatness and enabling maintenance of transmission performance at a high level.

Figure 6:
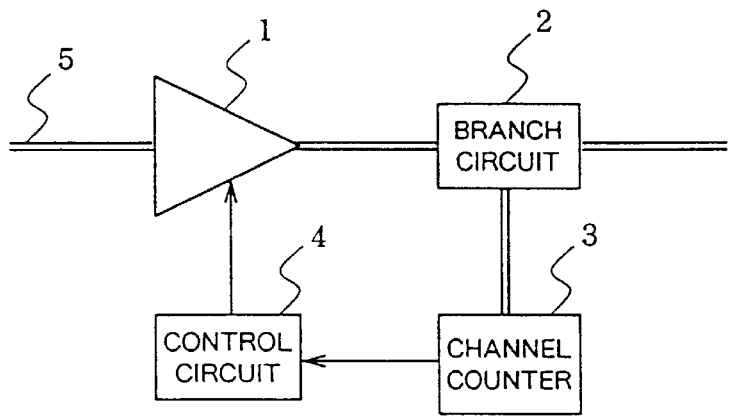
FIG. 6 is a block diagram showing the construction of another embodiment of the present invention.

Moreover, because the number of channels of input and output of optical signal amplifier 1 are the same, branch circuit 2 and channel counter 3 may be arranged in the output section of optical signal amplifier 1 as shown in FIG. 6. In the embodiment shown in FIG. 6, the number of optical signal waves included in the output light of optical signal amplifier 1 is counted and outputted to control circuit 4, and the output level of the optical signal amplifier 1 is controlled at control circuit 4 in accordance with the inputted channel number information.

Figure 7:
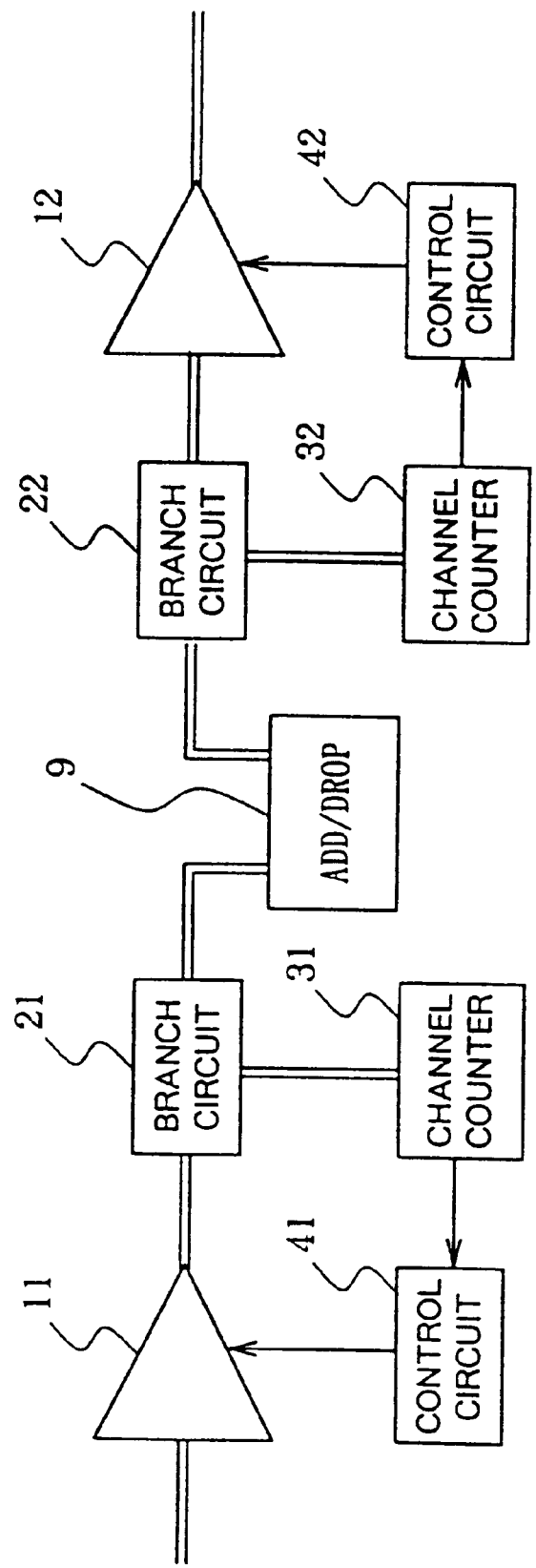
FIG. 7 is a block diagram showing the construction of another embodiment of the present invention.
Figure 8:
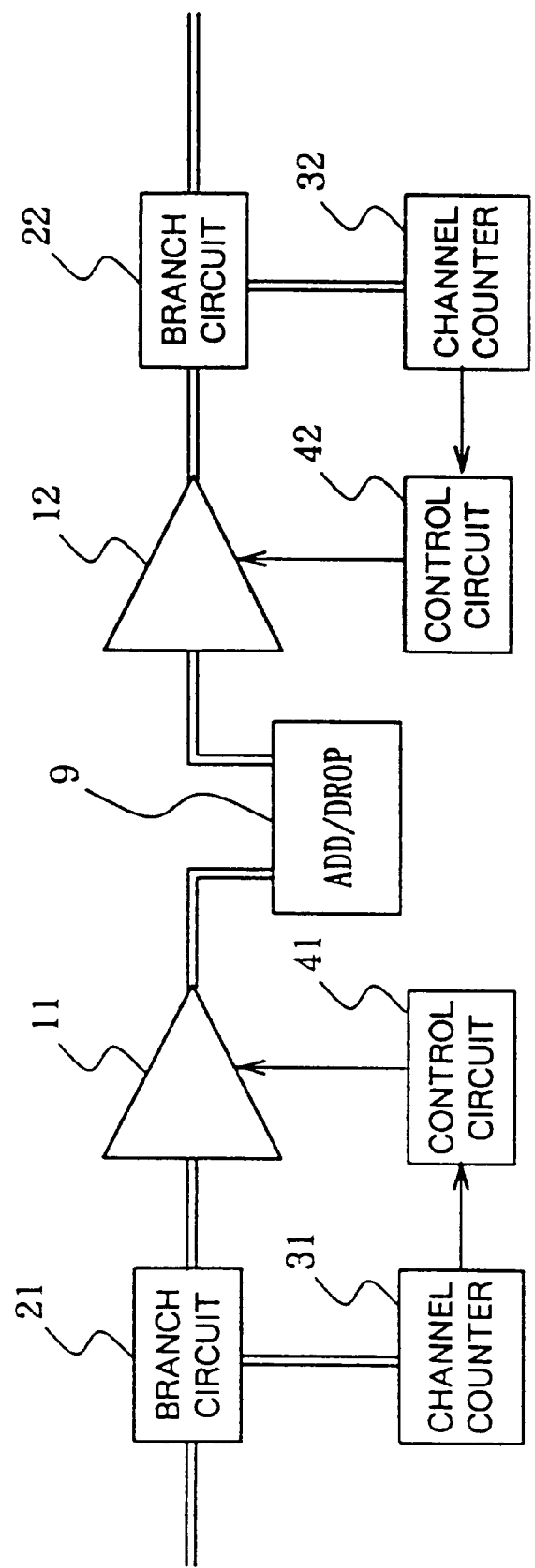
FIG. 8 is a block diagram showing the construction of another embodiment of the present invention.

FIG. 7 and FIG. 8 are block diagrams showing the construction of other embodiments of the present invention. The embodiments shown in FIG. 7 and FIG. 8 are devices having constructions in which ADD/DROP circuits 9 are arranged within the embodiments shown in FIG. 5 and FIG. 6.

In the embodiment shown in FIG. 7, ADD/DROP circuit 9 is arranged between optical signal amplifier 11, for which control is effected by branch circuit 21, channel counter 31, and control circuit 41 of the construction (optical amplification device) shown in FIG. 6, and optical signal amplifier 12, for which control is effected by branch circuit 22, channel counter 32, and control circuit 42 of the construction shown in FIG. 5.

Branch circuit 21 outputs optical signals to both channel counter 31 and ADD/DROP circuit 9. At ADD/DROP circuit 9, m channels are dropped and n channels are added.

In the embodiment shown in FIG. 8, control for optical signal amplifier 11 is effected by the construction shown in FIG. 5, control for optical signal amplifier 12 is effected by the construction shown in FIG. 6, and ADD/DROP circuit 9 is provided between these two components.

In each of the embodiments constructed according to the foregoing description, the operation of optical signal amplifiers 11 and 12 is always controlled based on information of the actual number of channels, thereby enabling stable gain flatness and the maintenance of transmission performance at a high level.

In the embodiments shown in FIG. 7 and FIG. 8, explanation was presented regarding devices having optical amplification devices in two stages, but a multi-stage construction may also be adopted with still more stages and interposed ADD/DROP circuits to effect more numerous branching and combining.

Moreover, the same effect can be obtained for a case in which an optical communication system is constructed by combining optical fiber amplifiers of the above-described embodiments of the present invention, which have the features of providing stable gain flatness and enabling the maintenance of high transmission performance as described hereinabove.

Figure 14:
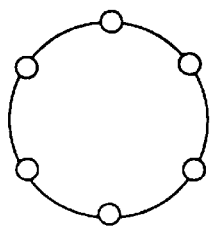
FIGS. 14(a)–(f) show configurations of optical communication systems in which nodes are assembled from optical fiber amplifiers according to the embodiments of the present invention.
Figure 14:
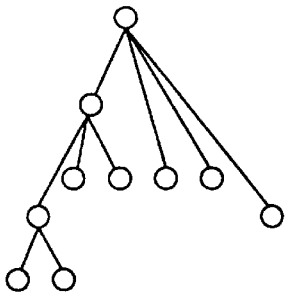
Figure 14:
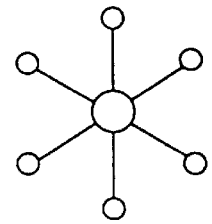
Figure 14:
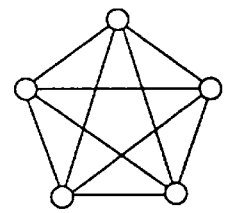
Figure 14:
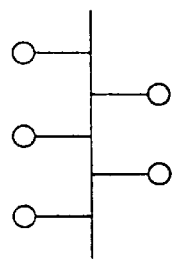
Figure 14:
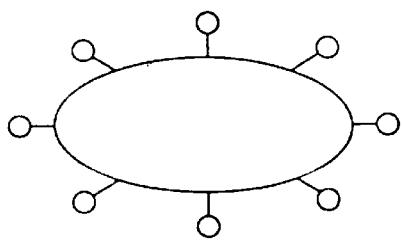

FIGS. 14(a) to 14(f) show the configurations of optical communication systems in which nodes are assembled from optical fiber amplifiers according to the embodiments of the present invention. FIGS. 14(a) to 14(d) show point-to-point systems, the system shown in FIG. 14(a) being constructed in a loop configuration, the system shown in FIG. 14(b) in a tree configuration, the system shown in FIG. 14(c) in a star configuration, and the system shown in FIG. 14(d) in a complete configuration. FIG. 14(e) and FIG. 14(f) are broadcasting systems, the system shown in FIG. 14(e) being constructed in a linear bus configuration, and the system shown in FIG. 14(f) being constructed in a ring bus configuration.

FIGS. 9 to 11 and FIGS. 12 to 13 are block diagrams and illustrative figures showing two examples of the basic construction of channel counters (3, 31, 32) that count the number of wavelengths in each of the above-described embodiments.

Figure 9:
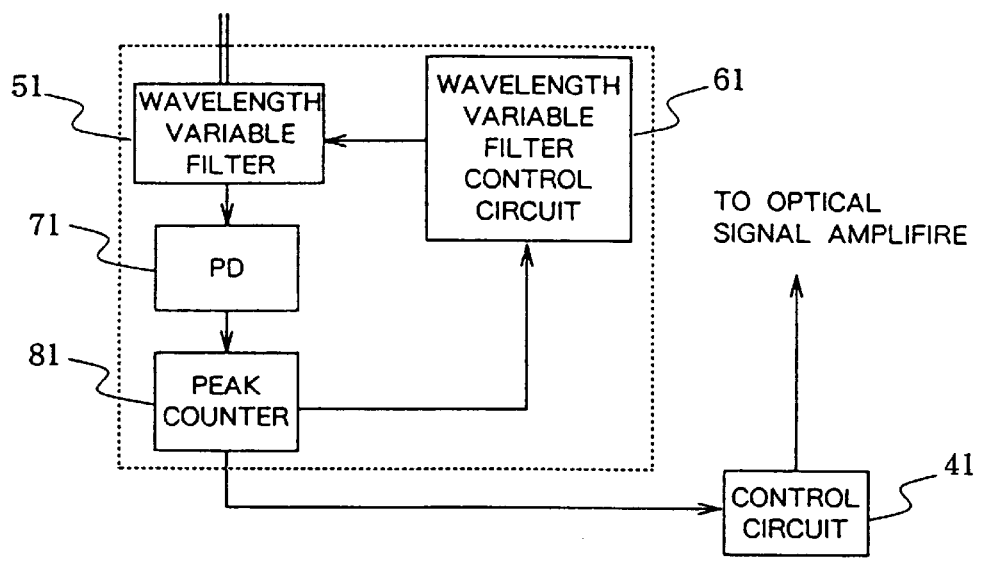
FIG. 9 is a block diagram showing the construction of a channel counter used in the present invention.
Figure 10:
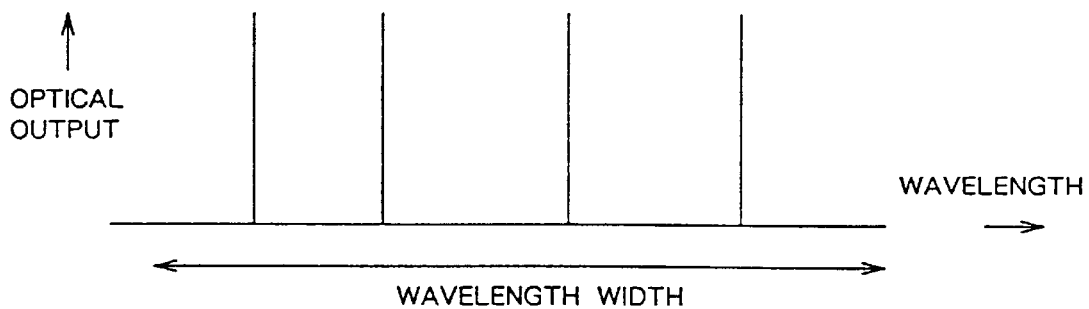
FIG. 10 shows the relation of optical output to wavelength sweep width for the channel counter shown in FIG. 9.
Figure 11:
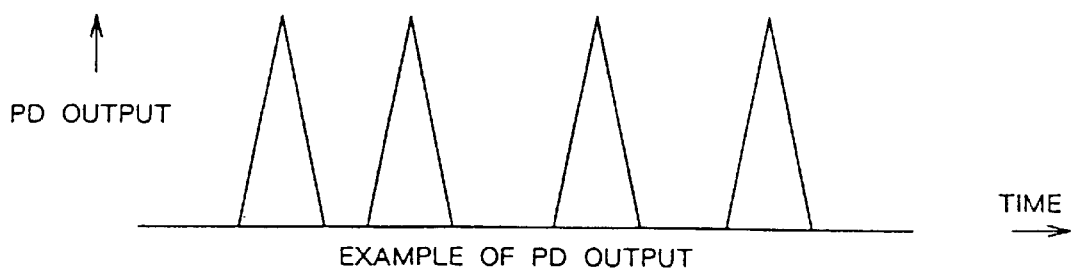
FIG. 11 shows the relation of photodetector (PD) output to PD output signal strings over time for the channel counter shown in FIG. 9.

First, regarding the system shown in FIGS. 9 to 11, the optical output of the branch circuits (2, 21, 22) in FIGS. 5 to 8 is inputted to wavelength variable filter 51. The output of wavelength variable filter 51 is inputted to PD 71, which is a photodetector, and converted to an electrical signal. The peak values in the output level of PD 71 are counted at peak counter 81 and outputted to control circuit 41. Variable wavelength filter 51 and peak counter 81 are synchronized by wavelength variable filter control circuit 61. This wavelength variable filter 51 is an optical bandpass filter that sweeps the signal bandwidth over time, the sweep method being, for example, a voltage-controlled method or a mechanical slide method. As an example, in a case in which a multiple-wavelength signal of four wavelengths is inputted as shown in FIG. 10, the output of PD 71 is as shown in FIG. 11, the peak values being counted by peak counter 81.

Figure 12:
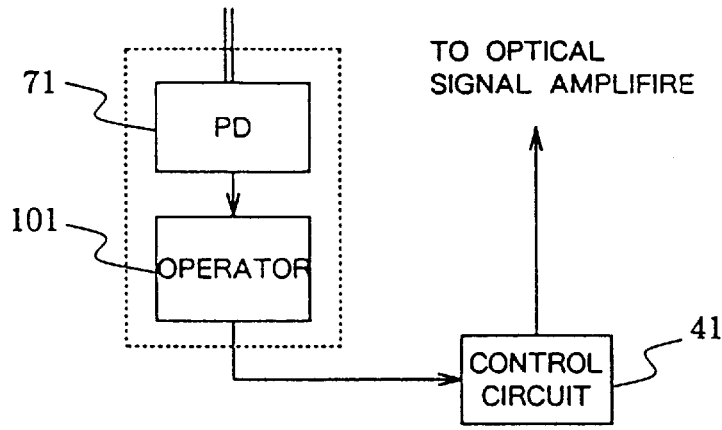
FIG. 12 is a block diagram showing the construction of another channel counter used in the present invention.
Figure 13:
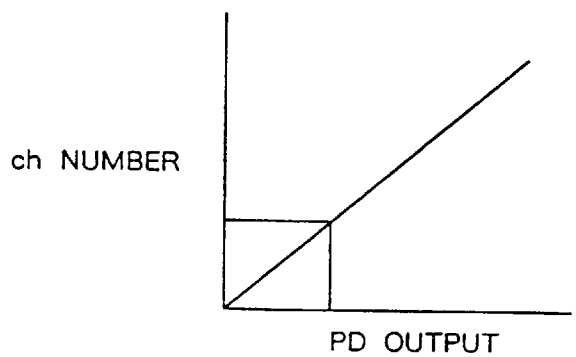
FIG. 13 shows the relation of channel number to PD output in the channel counter shown in FIG. 12.

Regarding the system shown in FIGS. 12 and 13, the output of the branch circuits (2, 21, 22) in FIGS. 5 to 8 is inputted to PD 71 and then inputted to operator 101. As shown in FIG. 13, the output of PD 71 increases or decreases in accordance with the number of channels. By using operator 101 to fix a correspondence between the output of PD 71 and the number of channels and saving this to memory in advance, the number of channels can be ascertained and channel number information obtained.

Explanation is next presented regarding a concrete example of the operation of each of the above-described embodiments. The construction employed here is equivalent to that of FIG. 7, and the adopted channel counter method is as described with respect to FIG. 12 and FIG. 13.

As the transmitted wavelengths, eight wavelengths were selected ranging from 1553 nm to 1560 at 1-nm intervals. The signal level of the wavelengths was inputted to branch circuit 21 as −20 dBm/ch (corresponding to −11 dBm/8 channels). The gain of optical signal amplifiers 11 and 12 was set such that the output level from optical signal amplifier 12 was +8 dBm/ch (corresponding to +17 dBm/8 ch). An AWG (Arrayed Waveguide Grating) was employed in the ADD/DROP circuit. The gain flatness when outputting eight wavelengths was 0.2 dB. The waveform flatness in the construction of this invention was compared with a case in which the operation of channel counters 31 and 32 was halted and wavelength information fixed at eight wavelengths was conferred to control circuits 41 and 42.

When the signals of a four-wavelength portion were dropped using ADD/DROP circuit 9, the gain flatness achieved by means of the present embodiment did not change more than 0.2 dB, but a large-scale deterioration of 1.0 dB was confirmed when the operation of the channel counters was halted. When the channel counters were put back into operation in this state, the gain flatness immediately improved to 0.2 dB, thereby confirming the effectiveness of this embodiment.

The construction according to the present invention as described hereinabove is particularly effective in controlling an optical fiber amplifier for multiple-wavelength transmission, and has the technical merits of maintaining gain flatness at a uniform level and stabilizing transmission performance.

While preferred embodiments of the present invention have been described using specific terms, such description is for illustrative purposes only, and it is to be understood that changes and variations may be made without departing from the spirit or scope of the following claims.

What is claimed is:

1. An optical fiber amplifier system comprising:
   an optical fiber;
   an optical signal amplifier that amplifies wavelength division multiplexed (WDM) optical signals transmitted on said optical fiber;
   a branch circuit that is arranged along a transmission path of said optical fiber and that branches off and extracts a portion of a transmitted optical signal power;
   a channel counter that receives a portion of the branched optical signal power from said branch circuit and that counts the number of WDM channels of the transmitted optical signals; and
   a control circuit that receives a single input exclusively from said channel counter and that controls the amplification factor of said optical signal amplifier exclusively in accordance with the number of WDM channels counted at said channel counter.

2. The optical fiber amplifier according to claim 1 wherein said branch circuit is arranged in the output portion of said optical signal amplifier.

3. The optical fiber amplifier according to claim 1 wherein said optical fiber is constituted by a fiber having a rare-earth additive.

4. The optical fiber amplifier system as recited in claim 1, wherein said optical fiber transmits the portion of the branched optical signal power from said branch circuit to said channel counter.

5. The optical fiber amplifier system as recited in claim 1, wherein said channel counter comprises:
   a photodetector that receives an input from said branch circuit; and
   an operator that fixes the correspondence between the output of said photodetector and the number of channels and stores the correspondence to a memory.

6. The optical fiber amplifier system as recited in claim 1, wherein said channel counter comprises:
   a wavelength variable filter that receives an input from said branch circuit;
   a photodetector that receives an input from said wavelength variable filter;
   a peak counter synchronized with said wavelength variable filter that receives an input from said photodetector and that provides an output to said control circuit; and
   a wavelength variable filter control circuit that receives an input from said peak counter and that provides an output to said wavelength variable filter.

7. The optical fiber amplifier system as recited in claim 6, wherein said wavelength variable filter control circuit synchronizes said wavelength variable filter and said peak counter.

8. The optical fiber amplifier according to claim 1 wherein said branch circuit is arranged in the input portion of said optical signal amplifier so that an output from said branch circuit is provided as input directly to said optical signal amplifier.

9. The optical fiber amplifier system as recited in claim 8, wherein said channel counter comprises:
   a photodetector that receives an input from said branch circuit; and
   an operator that fixes the correspondence between the output of said photodetector and the number of channels and stores the correspondence to a memory.

10. The optical fiber amplifier system as recited in claim 8, wherein said optical fiber transmits the portion of the branched optical signal power from said branch circuit to said channel counter.

11. The optical fiber amplifier system as recited in claim 8, wherein said channel counter comprises:
    a wavelength variable filter that receives an input from said branch circuit;
    a photodetector that receives an input from said wavelength variable filter;
    a peak counter synchronized with said wavelength variable filter that receives an input from said photodetector and that provides an output to said control circuit; and
    a wavelength variable filter control circuit that receives an input from said peak counter and that provides an output to said wavelength variable filter.

12. The optical fiber amplifier system as recited in claim 11, wherein said wavelength variable filter control circuit synchronizes said wavelength variable filter and said peak counter.

13. An optical fiber amplifier that is provided with optical signal amplifiers that amplify optical signals transmitted on an optical fiber, which is the optical signal transmission line, and control circuit sections that control the amplification operation of said optical signal amplifiers; comprising:

a plurality of optical amplification devices, each comprising:

a branch circuit that is arranged within said optical signal transmission route and that branches off and extracts a portion of the transmitted optical signal power; and a channel counter that inputs a portion of the branched optical signal power from said branch circuit and counts the number of channels of the transmitted optical signals;

wherein said control circuit sections control the amplification factors of said optical signal amplifiers in accordance with the number of channels counted at said channel counters; and wherein optical circuits that have a drop/add capability are provided between each of the plurality of optical amplification devices.

14. An optical fiber amplifier according to claim 13 wherein branch circuits making up any of the plurality of optical amplification devices are arranged in the input portions of the optical signal amplifiers.

15. The optical fiber amplifier according to claim 13 wherein branch circuits making up any of the plurality of optical amplification devices are arranged in the output portions of the optical signal amplifiers.

16. The optical fiber amplifier according to claim 13 wherein said optical fiber is constituted by a fiber having a rare-earth additive.

17. The optical communication system in which at least one optical fiber amplifier according to claim 13 is inserted within an optical transmission line.

* * * * *